(12) United States Patent
Cheng

(10) Patent No.: US 6,520,598 B1
(45) Date of Patent: Feb. 18, 2003

(54) SUPPORTING DEVICE WITH POSITION FIXING FUNCTION FOR FRONT WHEELS OF A STROLLER

(76) Inventor: Pao-Hsien Cheng, No. 139, Jen Yi 1st Street, Jen Te Hsiang, Tainan Hsien (TW)

( * ) Notice: Subject to any disclaimer, the term of this patent is extended or adjusted under 35 U.S.C. 154(b) by 0 days.

(21) Appl. No.: 10/026,897

(22) Filed: Dec. 27, 2001

(51) Int. Cl.⁷ .............................................. B60B 23/00
(52) U.S. Cl. .............................. 301/111.01; 301/111.06
(58) Field of Search ........................... 301/111.01, 121, 301/122, 111.06, 119, 120, 112, 117; 280/652, 654, DIG. 6

(56) References Cited

U.S. PATENT DOCUMENTS

| | | | | |
|---|---|---|---|---|
| 5,222,786 A | * | 6/1993 | Sovis et al. ............. | 301/111.05 |
| 5,529,385 A | * | 6/1996 | Tsao ...................... | 301/111.06 |
| 5,658,054 A | * | 8/1997 | Wu ........................ | 301/111.06 |
| 5,716,107 A | * | 2/1998 | Parker et al. ........... | 301/111.07 |
| 5,902,018 A | * | 5/1999 | Owen et al. ............. | 301/111.04 |
| 5,957,544 A | * | 9/1999 | Hu ......................... | 301/111.01 |
| 6,024,416 A | * | 2/2000 | Chen et al. ................ | 301/121 |
| 6,042,195 A | * | 3/2000 | Huang .................... | 301/111.06 |
| 6,056,369 A | * | 5/2000 | Lin ........................ | 301/111.06 |
| 6,099,083 A | * | 8/2000 | Logan ................... | 301/111.01 |
| 6,152,539 A | * | 11/2000 | Hu ......................... | 301/111.06 |
| 6,189,979 B1 | * | 2/2001 | Wu ........................ | 301/111.06 |
| 6,234,582 B1 | * | 5/2001 | Wu ........................ | 301/111.06 |
| 6,354,670 B1 | * | 3/2002 | Cheng .................... | 301/111.04 |
| 6,409,283 B1 | * | 6/2002 | Hsieh ..................... | 301/111.05 |
| 6,409,284 B1 | * | 6/2002 | Ko ......................... | 301/111.06 |

* cited by examiner

*Primary Examiner*—S. Joseph Morano
*Assistant Examiner*—Long Bao Nguyen
(74) *Attorney, Agent, or Firm*—Rosenberg, Klein & Lee (57) ABSTRACT

A supporting device for a front wheel of a stroller includes a locking member, a supporting member and a control member. The locking member is received in two aligned cylindrical parts of the supporting member, and has two protruding parts at upper portions of two resilient upright poles thereof; the protruding parts face a gap between the aligned cylindrical parts. The control member is pivoted to the supporting member, and has a locating part facing the gap of the supporting member. The supporting device is separably connected to a support tube of the stroller frame with the cylindrical parts being passed around the tube and the poles being passed into the tube; the protruding parts stick out through opposing lateral holes of the tube into the gap to prevent the tube and the supporting device from separating from each other. The control member can be pivoted to such a position as to make the locating part disposed in the gap; thus, the protruding parts can automatically fit into the locating part on the course of the stroller being moved around.

3 Claims, 8 Drawing Sheets

SUPPORTING DEVICE WITH POSITION FIXING FUNCTION FOR FRONT WHEELS OF A STROLLER

BACKGROUND OF THE INVENTION

The present invention relates to a supporting device with position fixing function for stroller front wheels, and more particularly a supporting device, which allows the front wheels to be separated from the main frame of the stroller for saving space in transportation and storage, and which can automatically fix the direction of the front wheels during the course of the user's pashing a control member thereof.

Figure 7:
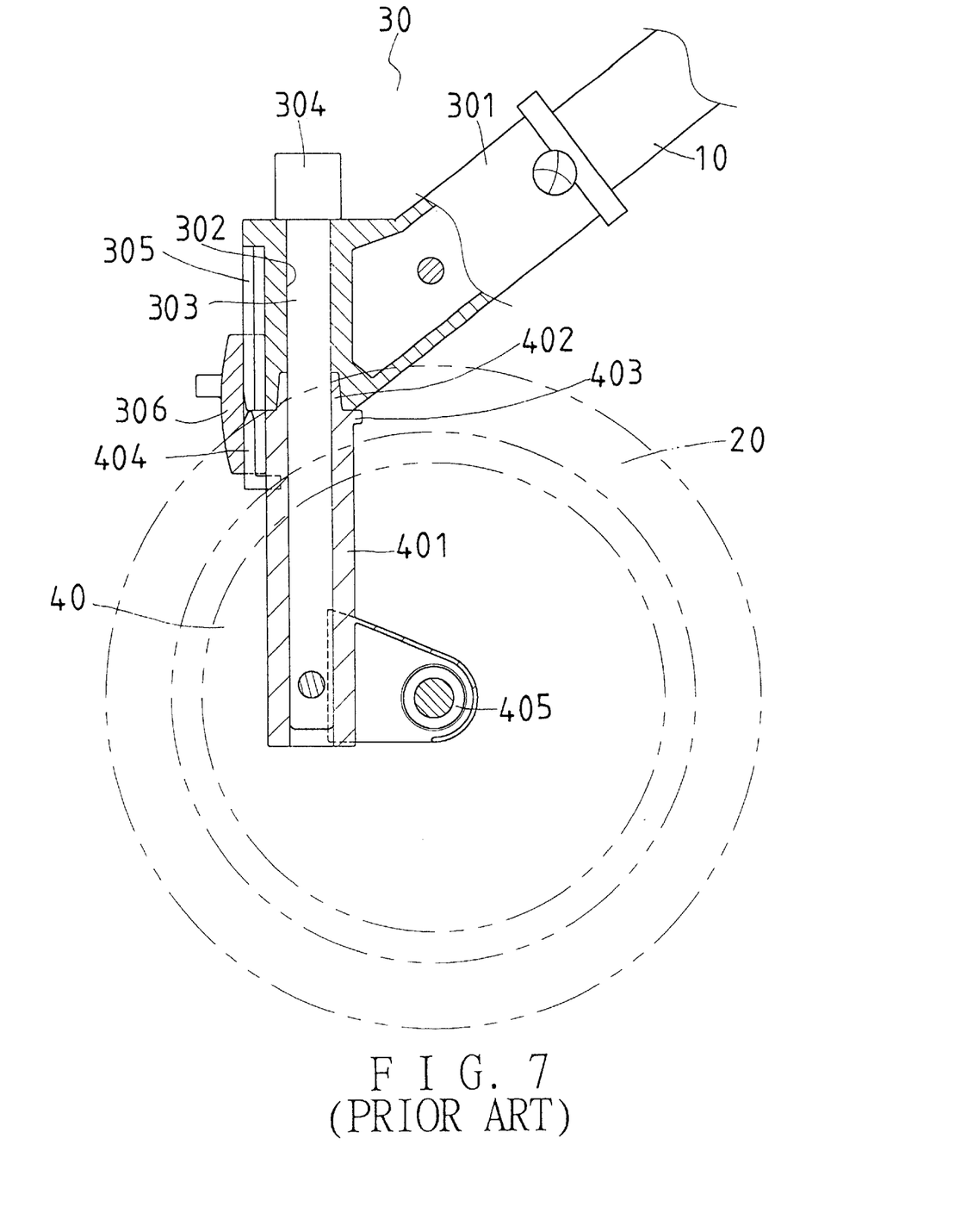
FIG. 7 is a view of the conventional supporting device for stroller wheels as described in the Background, in the locking position.
Figure 8:
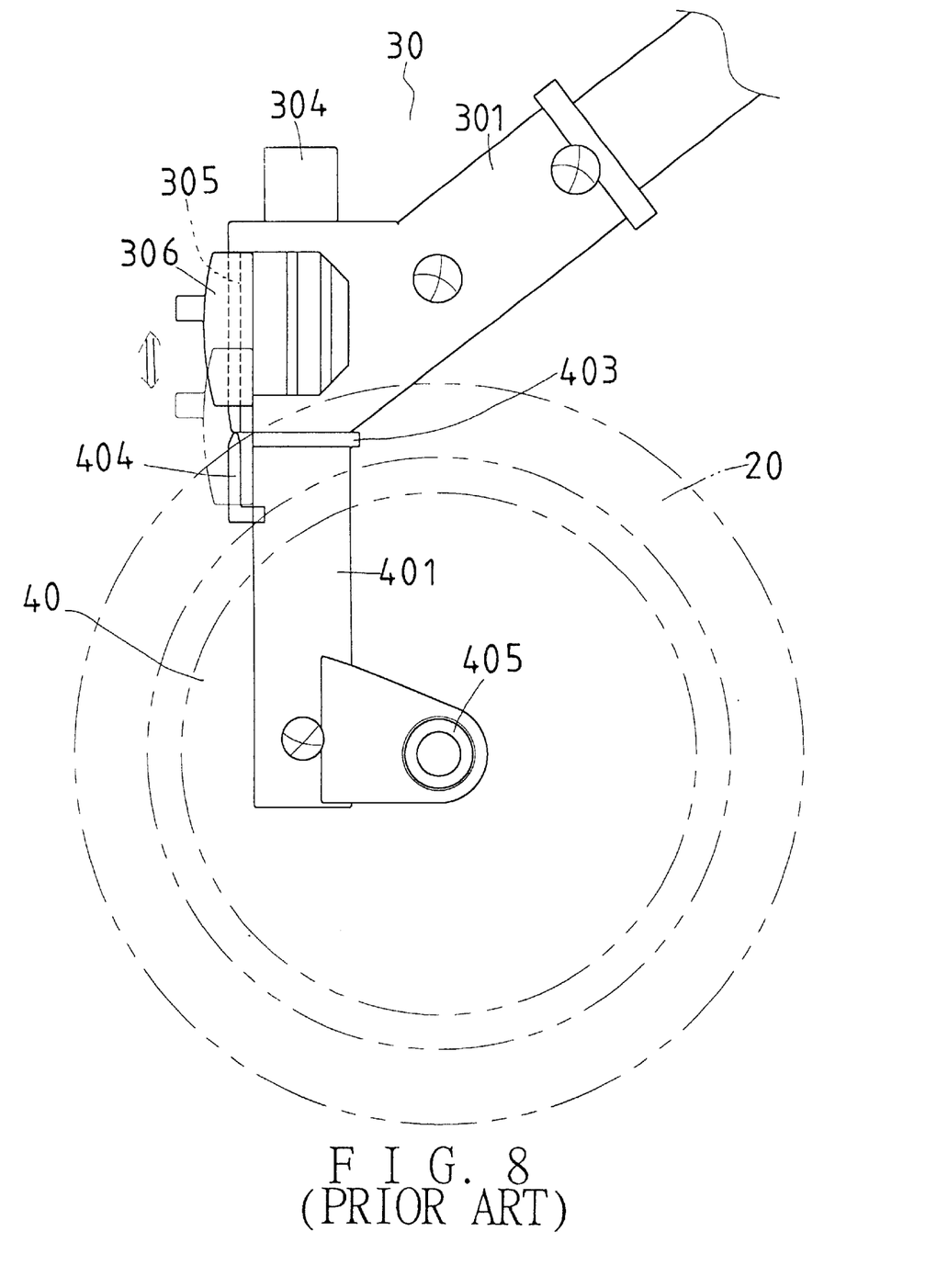
FIG. 8 is a view of the conventional supporting device in the unlocking position.

Referring to FIGS. 7 and 8, a heretofore known stroller has a connecting member 30 fitted to a lower end of a supporting frame 10 thereof. A locating member 40 is connected to the connecting member 30. A wheel 20 is rotatably connected to a connecting hole 405 of the locating member 40.

The connecting member 30 has a receiving hollow 301 fixedly holding the lower end of the supporting frame 10 therein, and a through hole 302, into which a connecting rod 303 is inserted. The connecting rod 303 has a head portion 304 at upper end thereof for engaging an upper end of the through hole 302. The connecting member 30 further has a guide rail 305, which has a substantially T-shaped cross-section, for permitting a sliding member 306 to be slidably connected therewith. The locating member 40 has a tube portion 401, into which a lower end portion of the connecting rod 303 is inserted, in order to connect both the connecting member 30 and the locating member 40; a fixing member (not numbered) is used to fixedly connect both the connecting rod 303 and the tube portion 401. The locating member 40 further has a guide rail 404 communicating with the guide rail 305 of the connecting member 30 such that the sliding member 306 can be moved into the guide rail 404 with upper end portion thereof still received in the guide rail 305. The tube portion 401 of the locating member 40 has an upper end portion 402 inserted into the through hole 302 of the connecting member 30, and an annular protrusion 403 engaging the lower end of the through hole 302.

In displaying or using the aforesaid stroller, the sliding member 306 is moved downward to be received in both the guide rails 305 and 404; thus, the locating member 40 cannot move relative to the connecting member 30, preventing the stroller from being unwarily moved sideways when a person accidentally pushed the stroller.

The above mentioned stroller has an advantage that it will not move sideways when being pushed because of the above said parts connected with the wheel. However, it has a disadvantage that the wheel is not detachable, and so takes extra room in packing and transportation. The manufacturer of the stroller has to use extra room in packing the stroller because of the wheel. The numbers of strollers of above said nature that are held in one container is smaller than that of those having same size and detachable wheels. Consequently, the transportation cost is higher.

Furthermore, the user has to turn the locating member 40 in order for the guide rail 404 to be aligned with the guide rail 305 of the connecting member 30 before he moves the sliding member 306 down for the same to engage with the guide rail 404 to fix the position of the wheel 20. So, the sliding member 306 is not easy to use.

SUMMARY OF THE INVENTION

Therefore, it is a main object of the present invention to provide a supporting device for front wheels of a stroller that allows the front wheels to be separated from the main frame of the stroller for saving space in storage and transportation.

It is another object of the present invention to provide the supporting device with a position fixing function that is easy to use for the wheels.

The supporting device of the present invention includes a supporting member, a control member, and a locking member. The supporting member is connected to an axle of the front wheel, and has both an upper cylindrical part and a lower cylindrical part; the lower cylindrical part and the upper one are aligned, and have a gap in between. The supporting member furthers has a locating plate sticking out from a rear side of the upper cylindrical part.

The control member is pivoted to the rear side of the upper cylindrical part, and has an engaging end portion capable of engaging with a first, and a second portions of the locating plate of the supporting member. The control member has a locating part, which will face the gap when the engaging end portion engages with the second portion of the locating plate.

The locking member is disposed in the cylindrical parts, and has two resilient poles sticking up from a bottom part thereof; the resilient poles each has a protruding parts removably received in the gap of the supporting member.

The lower end of the front support tube of the stroller frame is passed into the cylindrical parts plus around the locking member such that the protruding parts of the locking member each sticks out through one of two opposing holes of the front support tube to be received in the gap of the supporting member.

To fix the position of the front wheel, the control member is pivoted for the engaging end portion to engage with the second portion of the locating plate, thus allowing the locating part to face the gap; the protruding parts of the locking member will automatically engage with the locating part on the course of the stroller being push around, i.e. the user doesn't have to change the direction of the front wheel with his hands in order for the protruding parts to be able to engage with the locating part.

To remove the front wheel from the main frame of the stroller, the user only has to push the protruding parts of the locking member inward to make the same disengage from the opposing holes of the front support tube of the main frame, and then separate the supporting device from the support tube.

BRIEF DESCRIPTION OF THE DRAWINGS

The present invention will be better understood by reference to the accompanying drawings, wherein.

DETAILED DESCRIPTION OF THE PREFERRED EMBODIMENT

Figure 1:
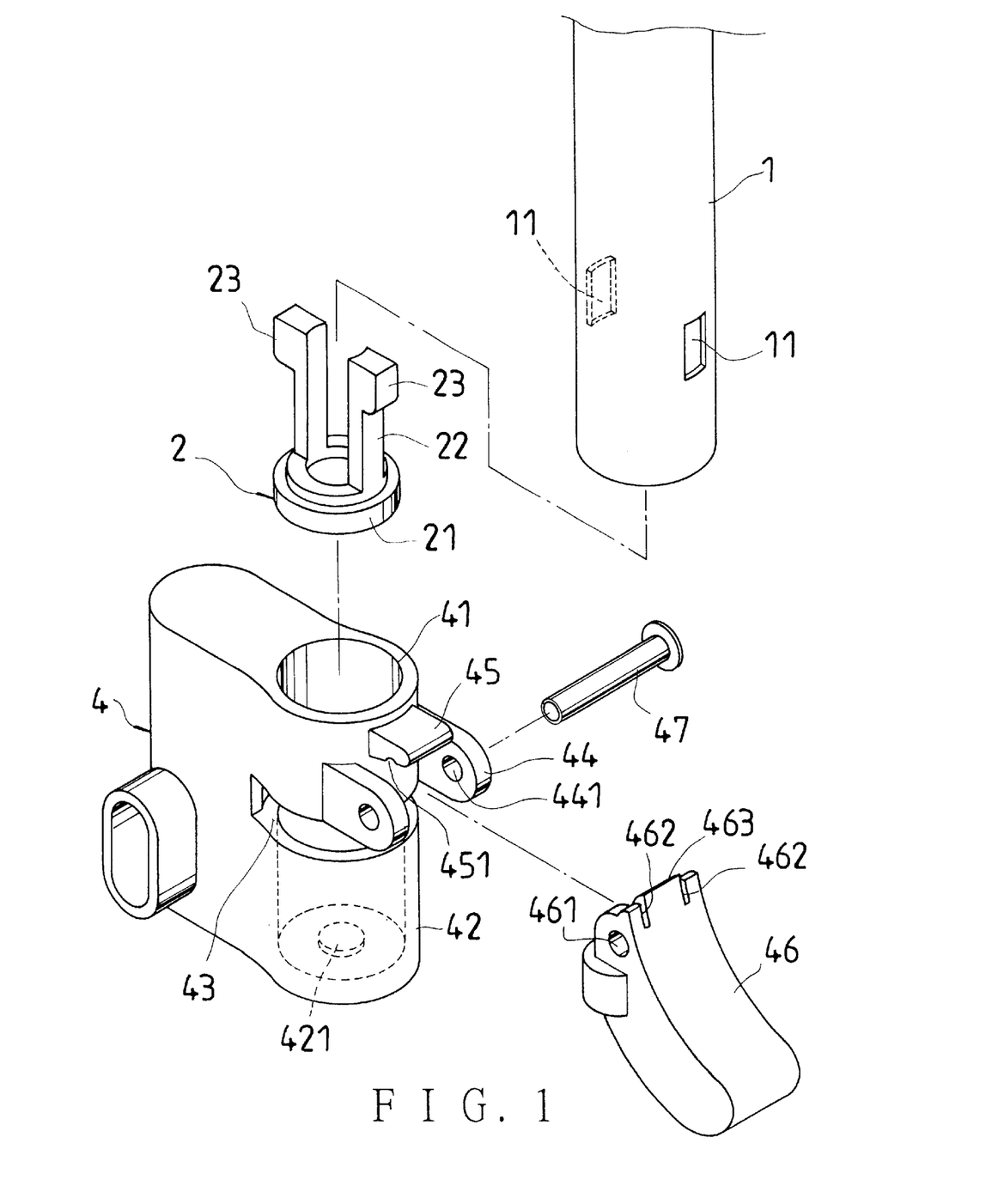
FIG. 1 is an exploded perspective view of the supporting device for stroller wheels according to the present invention.

Referring to FIG. 1, a supporting device with position fixing function for front wheels of a stroller according to the present invention includes a locking member 2, a supporting member 4, and a control member 46.

The supporting member 4 is provided with an elongated hole (not numbered) for supporting one axle of front wheels of a stroller. The stroller has two front support tubes 1. The supporting member 4 further has an upper cylindrical part 41, a lower cylindrical part 42 aligned with the upper cylindrical part 41, a gap 43 formed between the upper and the lower cylindrical parts 41 and 42, a locating plate 45, and two parallel connecting protrusions 44. The locating plate 45 sticks out from a rear side of the upper cylindrical part 41, and has an engaging trench 45 on a bottom side thereof. The parallel connecting protrusions 44 also stick out from the rear side of the upper cylindrical part 41, and are lower than the locating plate 45; the connecting protrusions 44 and 44 have through holes 441 and 441 aligned with each other. A platform 421 is formed at the center of round bottom of the lower cylindrical part 42.

The locking member 2 includes a disk-shaped bottom 21, and two poles 22 sticking up from the upper side of the disk-shaped bottom 21; the poles 22 are resilient, and each has a protruding part 23 at the upper end portion facing outwardly of the locking member 2.

Figure 2:
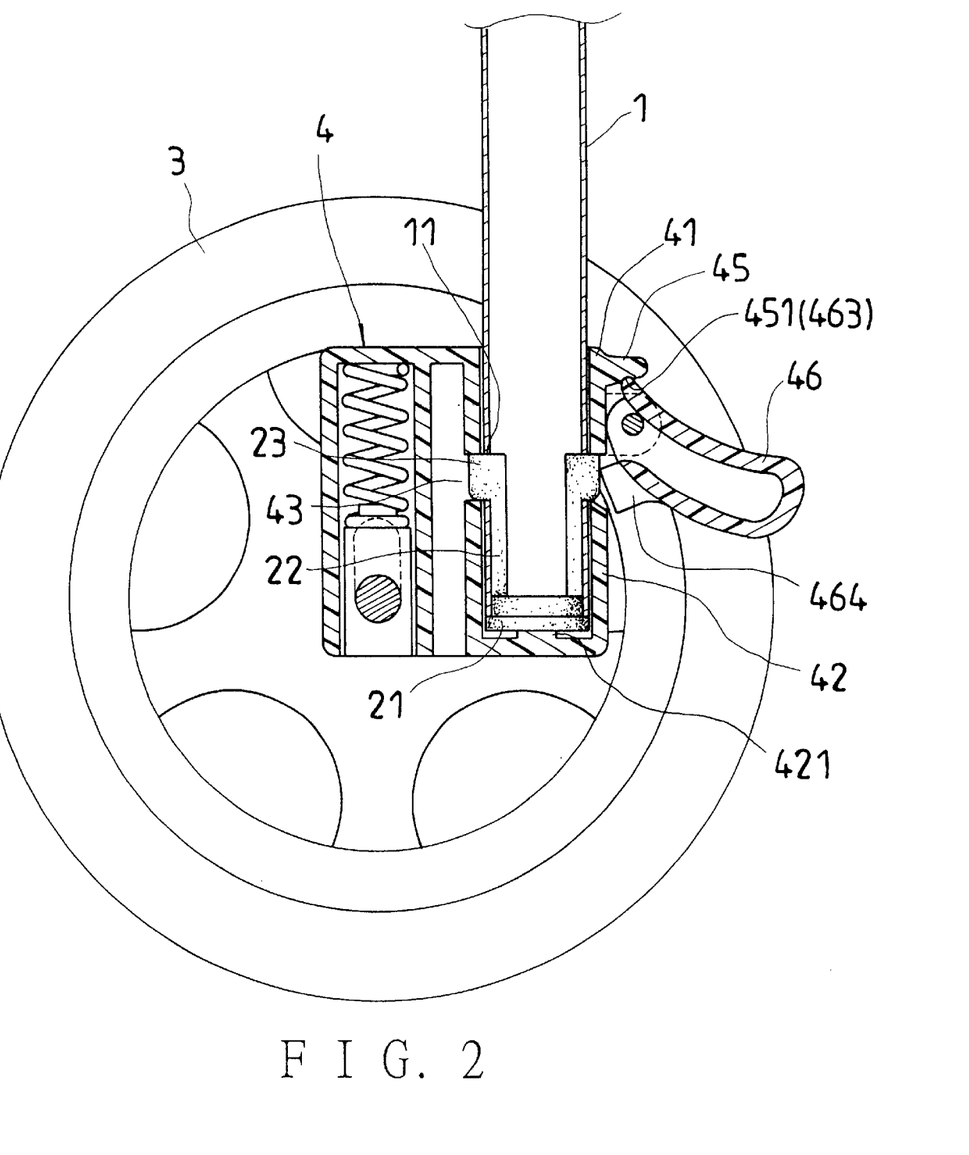
FIG. 2 is a side view of the supporting device for stroller wheels according to the present invention in the unlocking position.
Figure 3:
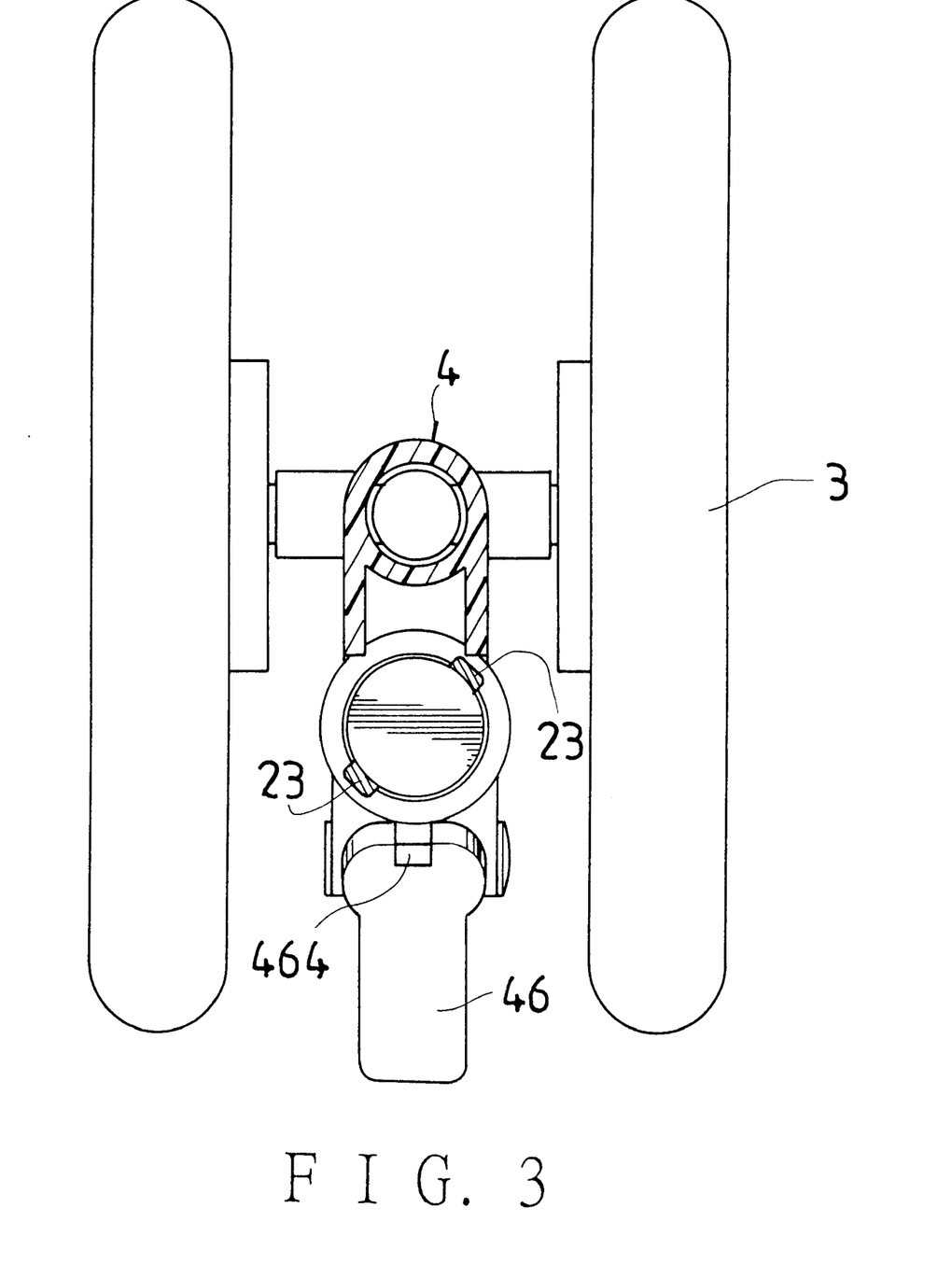
FIG. 3 is a bottom view of the supporting device of the present invention.
Figure 4:
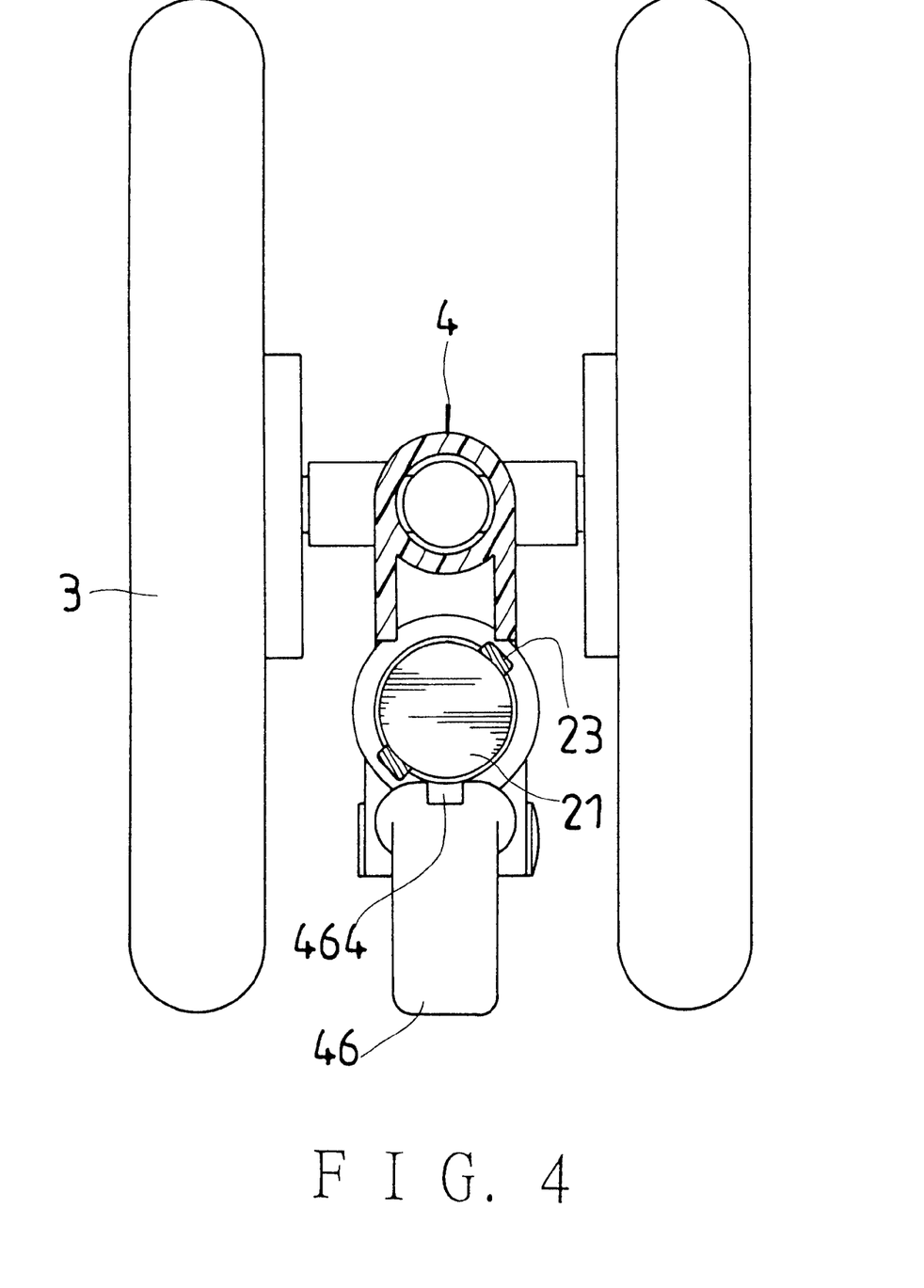
FIG. 4 is bottom view of the supporting device of the present invention in the locking position.

The control member 46 has through holes 461, an engaging end portion 463, two apertures 462 formed at two sides of the engaging end portion 463, and a locating part 464 formed lower than the through hole 461 on the front side thereof (shown in FIGS. 2, 3 and 4). The engaging end portion 43 is formed with a certain flexility because of the apertures 462 formed next to it.

In combination, the poles 22 of the locking member 2 are passed into the lower end of one of two front support tubes 1 of the stroller; the front support tubes 1 each has two opposing through holes 11 at both the front and the rear sides, and the protruding parts 23 at the upper end portion of the poles 22 are each passed through one of the through holes 11 to stick out from the tube 1; the disk-shaped bottom 21 of the locking member 2 has a larger diameter than the tube 1, therefore the same is stopped from passing into the tube 1 by the lower end of the tube 1. The lower end portion of the front support tube 1 is passed through both the upper and the lower cylindrical parts 41 and 42 such that the lower side of the disk-shaped bottom 21 of the locking member 2 is pressed against the top of the platform 421 in the lower cylindrical part 42, and those portions of the protruding parts 23 that stick out from the tube 1 are just received in the gap 43 between the upper and the lower cylindrical parts 41 and 42.

The control member 46 is pivoted to the connecting protrusions 44 of the supporting member 4 by means of passing a pivotal rod 47 through the through holes 461 and 441; thus, the control member 46 can be located at a first position where the engaging end portion 463 engages with the engaging trench 451 of the locating plate 45, and a second position when the locating part 464 is pushed so as to move the engaging end portion 463 to the outer end of the locating plate 45.

Referring to FIG. 2, when the control member 46 is moved to the first position, the locating part 464 thereof can't engage with the outward portions of the protruding parts 23 of the locking member 2, allowing the supporting member 4 to pivot about the front support tube 1 when the stroller is pushed around. In other words, the direction of the front wheels can be changed when the control member 46 is located at the first position.

Figure 5:
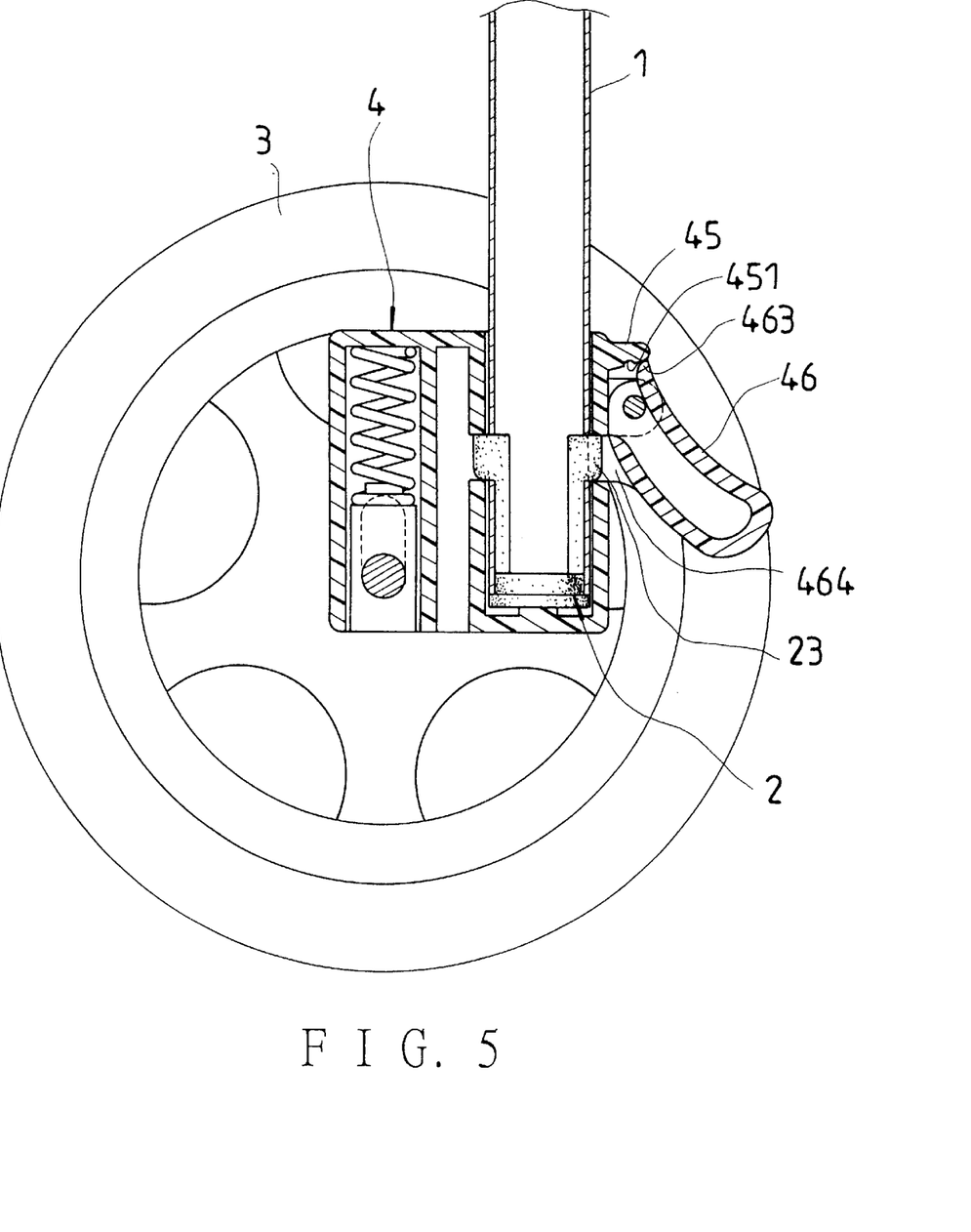
FIG. 5 is a side view of the supporting device of the present invention in the locking position.
Figure 6:
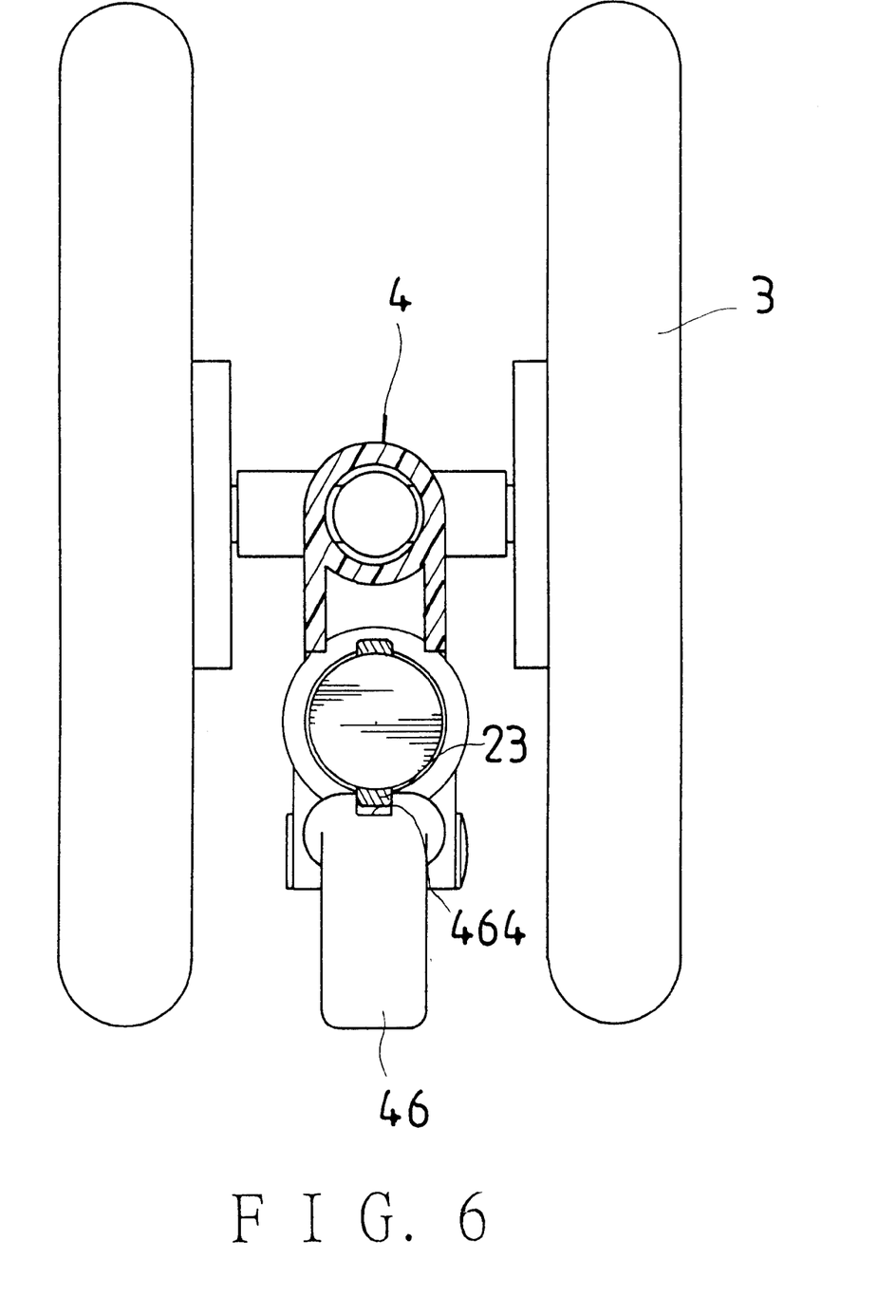
FIG. 6 is a bottom view of the supporting device of the present invention fixing the wheel in the forward position.

Referring to FIGS. 4 and 5, when the control member 46 is moved to the second position, the locating part 464 thereof is located so close to the front support tube 1 as to be able to engage with the outward portions of the protruding parts 23; when the supporting member 4 is pivoted to such a position that the front wheels is directed to the front of the stroller, the protruding parts 23 can snap into, and engage with, the locating part 464 due to the resilience of the poles 22. Thus, the position of the front wheel is fixed, and the stroller can only be moved forwards or rearwards without possibility of change of direction to the sides.

To remove the front wheel from the front support tube 1 of the stroller, the control member 46 is moved to the first position for the locating part 464 to disengage from the protruding parts 23 of the locking member 2, and then the supporting member 4 is pivoted to such a position as to allow the protruding parts 23 to show on lateral sides of the gap 43 for the user to press the protruding parts 23 inwardly of the front support tube 1. Thus, the protruding parts 23 disengage from the through holes 11 of the front support tube 1, allowing the front wheel and the supporting device to be removed from the front support tube 1 of the stroller.

From the above description, it can be easily understood that the supporting device for front wheels of a stroller has desirable features as follows:

1. The supporting device allows the front wheel connected thereto to be removed from the stroller together therewith, therefore both can be placed in spare room of the packing case to save space in storage and transportation. Consequently, the cost of storage and transportation is reduced.
2. The user doesn't have to move the supporting member 4 to a particular orientation in order for the locating part 464 of the control member 46 to be able to engage with the protruding parts 23; when the control member 46 is located at the second position, the protruding parts 23 will be automatically fitted onto the locating part 464 during the course of the stroller being pushed around. In other words, the supporting member 4 is relatively easy to use in respect of the function of fixing the position of the front wheel as compared to the conventional one of the Background.

What is claimed is:

1. A supporting device for a front wheel of a stroller, comprising a supporting member connected to an axle of said front wheel; said support member having an upper cylindrical part and a lower cylindrical part aligned with said upper cylindrical part at a rear portion thereof; said cylindrical parts having a gap in between; said supporting member having a locating plate sticking out from a rear side of said upper cylindrical part; said locating plate having an engaging trench on a lower side;

a control member pivoted to said rear side of said upper cylindrical part; said control member having an engaging end portion capable of separably engaging with said engaging trench of said locating plate of said supporting member; said control member having a locating part substantially facing said gap of said supporting member;

a locking member disposed in said cylindrical parts; said locking member having a bottom part placed on a lower portion of said lower cylindrical part; said locking member having two resilient poles sticking up from said bottom part thereof; said resilient poles each having a protruding parts at an upper end portion removably received in said gap of said supporting member;

said supporting device being separably connected to lower end portion of a front support tube of said stroller with said cylindrical parts being mounted around said lower end portion and with said protruding parts of said locking member sticking out through a respective one of holes of both a front and a rear sides of said tube lower end portion from an inner side of said tube so as to received in said gap to prevent said supporting device from falling off said tube; said locating part of said control member being kept away from said protruding parts of said locking member when said engaging end portion engages with said trench of said locating plate, allowing said supporting member to turn about said tube for a direction of said front wheel to be changed; said locating part being moved into said gap to such a degree as to be engagable with said protruding parts when said engaging end portion is moved away from said engaging trench to an outer end of said locating plate, thus preventing an orientation of said supporting member in relation to said front support tube from changing.

2. The supporting device for a front wheel of a stroller as claimed in claim 1, wherein said supporting member has a platform at a center of a lower side of said lower cylindrical part, and said bottom part of said locking member is shaped like a disk; said disk-shaped bottom part being pressed against a top of said platform.

3. The supporting device for a front wheel of a stroller as claimed in claim 1, wherein said control member is further provided with two apertures at two sides of said engaging end portion thereof for same to be flexible.

* * * * *